United States Patent
Ren et al.

(10) Patent No.: US 12,403,599 B2
(45) Date of Patent: Sep. 2, 2025

(54) MOTION TERRAIN DETERMINING METHOD, ROBOT, AND COMPUTER-READABLE STORAGE MEDIUM

(71) Applicant: UBTECH ROBOTICS CORP LTD, Shenzhen (CN)

(72) Inventors: Xiaoyu Ren, Shenzhen (CN); Liqun Huang, Shenzhen (CN); Huan Tan, Shenzhen (CN); Youjun Xiong, Shenzhen (CN)

(73) Assignee: 2021A351US1, Shenzhen (CN)

( * ) Notice: Subject to any disclaimer, the term of this patent is extended or adjusted under 35 U.S.C. 154(b) by 434 days.

(21) Appl. No.: 18/081,611

(22) Filed: Dec. 14, 2022

(65) Prior Publication Data
US 2023/0182328 A1    Jun. 15, 2023

(30) Foreign Application Priority Data

Dec. 14, 2021   (CN) .......................... 202111526061.8

(51) Int. Cl.
   *B25J 9/16*    (2006.01)
   *B25J 19/02*   (2006.01)

(52) U.S. Cl.
   CPC ........... *B25J 9/1664* (2013.01); *B25J 9/1656* (2013.01); *B25J 9/162* (2013.01); *B25J 19/02* (2013.01)

(58) Field of Classification Search
   CPC ... B25J 9/02; B25J 9/162; B25J 9/1656; B25J 9/1664; G05B 2219/40264; G05B 2219/40298
   See application file for complete search history.

(56) References Cited

U.S. PATENT DOCUMENTS

| | | | |
|---|---|---|---|
| 10,919,152 B1* | 2/2021 | Kalouche | B25J 9/1697 |
| 2019/0291277 A1* | 9/2019 | Oleynik | B25J 9/1669 |
| 2021/0370510 A1* | 12/2021 | Mao | B25J 13/086 |
| 2022/0105627 A1* | 4/2022 | Ebrahimi | B25J 9/163 |
| 2023/0027130 A1* | 1/2023 | Simard | B25J 9/1666 |
| 2024/0303859 A1* | 9/2024 | Nakamura | G06T 7/251 |

FOREIGN PATENT DOCUMENTS

| | | | |
|---|---|---|---|
| CN | 107305376 A | 10/2017 | |
| JP | H03184788 A | 8/1991 | |

* cited by examiner

*Primary Examiner* — Wade Miles
*Assistant Examiner* — Zachary Joseph Wallace

(57) ABSTRACT

A motion terrain determining method, a robot, and a computer-readable storage medium are provided. The method includes: determining each sine parameter and each cosine parameter corresponding to a target joint in a plurality of joints of the robot according to one or more constraint conditions; determining a motion trajectory of the robot according to the sine parameter and the cosine parameter corresponding to the target joint; and determining a motion terrain of the robot according to the motion trajectory. In this manner, the best motion terrain can be obtained, and the robot is controlled to move on the determined motion terrain when determining the dynamics parameters of the robot, where the obtained dynamics parameters are more accurate to effectively improve the efficiency of the identification of the dynamics parameters.

20 Claims, 7 Drawing Sheets

Select a plurality of points on the motion trajectory, where a distance between every two of the adjacent points is within a preset distance range — S310

Select a k-th intermediate point between the k-th point and the (k+1)-th point, where the k-th intermediate point is on the motion trajectory; 1≤k≤K-1 when the motion trajectory is not a closed-loop curve connected end to end, and 1≤k≤K when the motion trajectory is a closed-loop curve connected end to end, where K is a total number of the plurality of points; and the (k+1)-th point is the first point in the plurality of points when k=K — S320

Determine k-th plane in a plurality of planes according to a triangle formed by the k-th point, the (k+1)-th point, and the k-th intermediate point — S330

Determine the motion terrain according to one of the K-th plane in the plurality of planes and the (K-1)-th plane in the plurality of planes — S340

MOTION TERRAIN DETERMINING METHOD, ROBOT, AND COMPUTER-READABLE STORAGE MEDIUM

CROSS REFERENCE TO RELATED APPLICATIONS

The present disclosure claims priority to Chinese Patent Application No. 202111526061.8, filed Dec. 14, 2021, which is hereby incorporated by reference herein as if set forth in its entirety.

BACKGROUND

1. Technical Field

The present disclosure relates to robot technology, and particularly to a motion terrain determining method, a robot, and a computer-readable storage medium.

2. Description of Related Art

With the rapid development of multi-degree-of-freedom mobile robots (for example, humanoid robots, robotic dogs, or the like that are freely movable), the mobile robots are widely used in various fields such as medical care, education, and industry. In the external force estimation and motion control of a mobile robot, it is essential to obtain accurate dynamics parameters of the mobile robot. The accuracy and rapidity of the identification of dynamics parameters are not only related to the selected parameter identification model and estimation method, but also related to the motion terrain with regard to parameter identification to a large extent.

The existing identification methods of dynamics parameters generally adopt the existing environmental terrain as the motion terrain of the mobile robot and ignore the influence of the motion terrain on the accuracy of the identification of dynamics parameters, which results in poor accuracy and low efficiency of the identification of dynamics parameters.

BRIEF DESCRIPTION OF THE DRAWINGS

To describe the technical schemes in this embodiment or in the prior art more clearly, the following briefly introduces the drawings required for describing the embodiments. It should be understood that, the drawings in the following description merely show some embodiments, and therefore should not be regarded as limiting the protection scope of the present disclosure. In each of the drawings, similar elements are given similar reference numerals.

DETAILED DESCRIPTION

Figure 1:
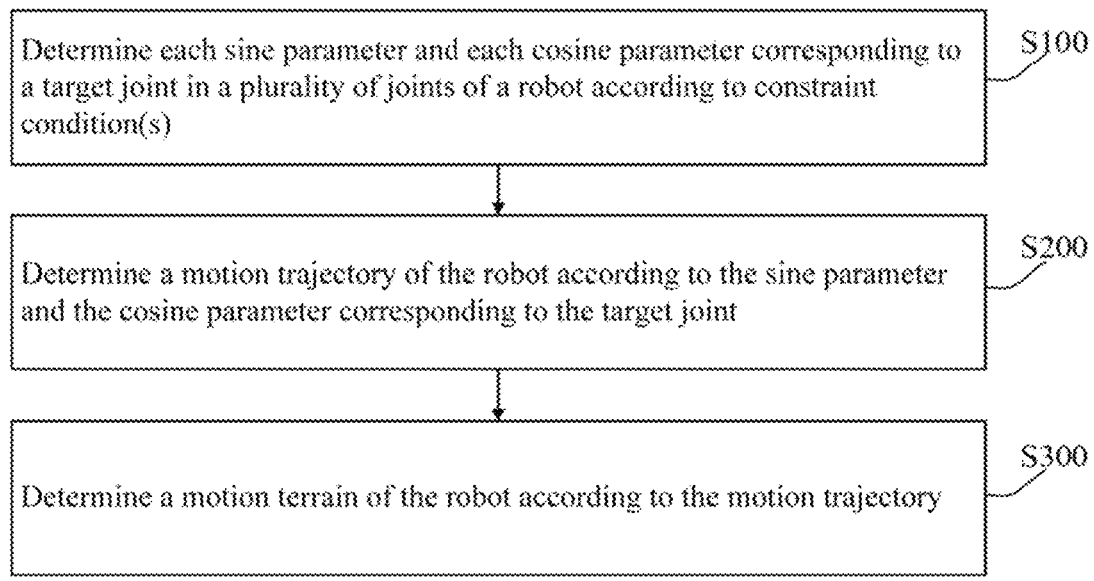
FIG. 1 is a flow chart of a motion terrain determining method according to an embodiment of the present disclosure.

The technical solutions in the embodiments of the present disclosure will be clearly and completely described below with reference to the drawings in the embodiments of the present disclosure. Apparently, the described embodiments are part of the embodiments of the present disclosure, not all of the embodiments.

The components of the embodiments of the present disclosure that are described and illustrated in the drawings herein may generally be arranged and designed in a variety of different configurations. Therefore, the following detailed description of the embodiments of the present disclosure provided in the drawings is not intended to limit the scope of the present disclosure, but merely represent the selected embodiments of the present disclosure. Based on the embodiments in the present disclosure, all other embodiments obtained by those of ordinary skill in the art without creative work fall within the protection scope of the present disclosure.

Hereinafter, the terms "comprising", "having" and their cognates that can be used in various embodiments of the present disclosure are only intended to represent specific features, numbers, steps, operations, elements, components or combinations of the foregoing, and should not be understood as in the premise of excluding the possibilities of having one or more other features, numbers, steps, operations, elements, components or combinations of the foregoing or adding one or more features, numbers, steps, operations, elements, components or combinations of the foregoing.

In addition, the terms "first", "second", "third", and the like in the descriptions are only used for distinguishing, and cannot be understood as indicating or implying relative importance.

Unless otherwise defined, all terms (including technical terms and scientific terms) used herein have the same meaning as commonly understood by those of ordinary skill in the art to which the various embodiments of the present disclosure belong. The terms (e.g., those defined in commonly used dictionaries) will be interpreted as having the same meaning as the contextual meaning in the relevant technical field and will not be interpreted as having an idealized meaning or an overly formal meaning, unless clearly defined in the various embodiments of the present disclosure.

Embodiment I

FIG. 1 is a flow chart of a motion terrain determining method according to an embodiment of the present disclosure. In this embodiment, a computer-implemented motion terrain determining method is provided. The motion terrain determining method is applied to (a processor of) a robot (e.g., a mobile robot). In other embodiments, the method may be implemented through a motion terrain determining apparatus shown in FIG. 6 or a robot shown in FIG. 7. As shown in FIG. 1, in this embodiment, the motion terrain determining method may include the following steps.

S100: determining each sine parameter and each cosine parameter corresponding to a target joint in a plurality of joints of the robot according to constraint condition(s).

It should be noted that, the constraint condition(s) may include at least one of terrain constraint(s), a moving velocity constraint of a mobile platform for moving the robot.

In which, the terrain constraint(s) may include at least one of a target position coordinate of a base coordinate system of the robot being within a preset calibration range, a change rate of the target position coordinate being within a preset positional change rate range, a target posture angle coordinate of the base coordinate system of the robot being within a preset angle range, and a change rate of the target posture angle coordinate being within a preset angle change rate range. As an example, the robot may be composed of the mobile platform and robotic arm(s) disposed on the mobile platform. In this case, the moving velocity constraint of the mobile platform is just that of the robot.

As an example, the target position coordinate of the base coordinate system of the robot may be within the preset calibration range, that is, the activity space of the robot may be limited so that the robot is controlled to move within the preset calibration range. It can be understood that when the robot is moved, the base coordinate system of the robot moves with the movement of the robot. If the origin of the base coordinate system is used as the target position, the target position coordinate will be the coordinate of the origin of the base coordinate system in a fixed coordinate system. If the target position coordinate (x, y, z) is denoted as $r_B$, then $r_{min} \leq r_B \leq r_{max}$, where this formula can be understood as that $r_{min}$ and $r_{max}$ are two coordinate points on the diagonal of a square or rectangle, and the target position coordinate is limited within the square or rectangle formed by $r_{min}$ and $r_{max}$.

As an example, the change rate of the target position coordinate of the base coordinate system of the robot may be within the preset positional change rate range, that is, the moving velocity of the base coordinate system of the robot in the fixed coordinate system may be limited. The constraint may be expressed as $\dot{r}_{min} \leq \dot{r}_B \leq \dot{r}_{max}$, which may be understood as that $\dot{r}_B$ represents the derivative at the target position coordinate $r_B$ (i.e., the moving velocity at the target position coordinate $r_B$), $\dot{r}_{min}$ represents the preset minimum velocity, and $\dot{r}_{max}$ represents the preset maximum velocity.

As an example, the target posture angle coordinate of the base coordinate system of the robot may be within the preset angle range, that is, the target posture angle coordinate ($\varphi_{B,x}$, $\varphi_{B,y}$, $\varphi_{B,z}$) of the base coordinate system of the robot in the fixed coordinate system may be limited in a preset range, where $\varphi_{B,x}$ represents the posture angle of the x-coordinate axis of the base coordinate system of the robot, $\varphi B_{B,y}$ represents the posture angle of the y-coordinate axis of the base coordinate system of the robot, and $\varphi_{B,z}$ represents the posture angle of the z-coordinate axis of the base coordinate system of the robot. The constraint may be expressed as $\varphi_{min} \leq \varphi_{B,x}, \varphi_{B,y} \leq \varphi_{max}$, where $\varphi_{min}$ represents a preset minimum angle, and $\varphi_{max}$ represents a preset maximum angle.

As an example, the change rate of the target posture angle coordinate is within a preset range of angular change rate, and the constraint may be expressed as $\dot{\varphi}_{min} \leq \dot{\varphi}_{B,x}, \dot{\varphi}_{B,y} \leq \dot{\varphi}_{max}$, where $\dot{\varphi}_{min}$ represents a preset minimum angle change rate of, and $\dot{\varphi}_{max}$ represents a preset maximum angle change rate.

In which, the moving velocity constraint may include: mapping the base coordinate system to a coordinate system of the mobile platform according to a mapping function between the base coordinate system of the robot and the coordinate system of the mobile platform; and constraining a moving velocity of the coordinate system of the mobile platform within a preset velocity range.

As an example, the above-mentioned mapping function may be determined according to the structure of the mobile platform and the position of the robot on the mobile platform in advance, and may be expressed as $f_B()$. Then, the moving velocity of the coordinate system of the mobile platform will be $\dot{q}_{B\_LOCAL} = f_B(q_B)$, where $q_B$ is the pose of the origin of the base coordinate system at the fixed coordinate system that may be denoted as (x, y, z, $\varphi_{B,x}$, $\varphi_{B,y}$, $\varphi_{B,z}$).

It can be understood that the moving velocity of the coordinate system of the mobile platform may include the angular velocity ($w_x$, $w_y$, $w_z$) of the mobile platform and the linear velocity ($v_x$, $v_y$, $v_z$) of the mobile platform in the directions of the x, y and z coordinate axes. If the angular velocity $w_x$ of the mobile platform and the linear velocity $v_x$ of the mobile platform in the direction of the x coordinate axis are limited, the moving velocity constraint may be expressed as $v_{min} \leq v_x \leq v_{max}$ and $w_{min} \leq w_x \leq w_{max}$, where $v_{min}$ represents a preset minimum linear velocity, and $v_{max}$ represents a preset maximum linear velocity, $w_{min}$ represents a preset minimum angular velocity, and $w_{max}$ represents a preset maximum angular velocity.

In which, the position constraint of the centroid may include constraining a position of the centroid within a preset positional range. It can be understood that limiting the centroid of the robot within the preset position range can prevent the robot from tilting, falling from the mobile platform, and can avoid the overturning of the mobile platform.

In which, the target joint may be any of the plurality of joints of the robot, and when the target joint is the i-th joint, the Fourier-related constraints includes an equation of:

$$\sum_{l=1}^{L} \frac{b_{i,l}}{l} = q_{0,i}$$

$$\sum_{l=1}^{L} l * b_{i,l} = 0$$

$$\sum_{l=1}^{L} a_{i,l} = 0$$

$$-q_{i,min} + q_{0,i} \leq \sum_{l=1}^{L} \sqrt{a_{i,l}^2 + b_{i,l}^2} \leq q_{i,max} - q_{0,i}$$

$$\sum_{l=1}^{L} w_f * l * \sqrt{a_{i,l}^2 + b_{i,l}^2} \leq \dot{q}_{i,max}$$

where, $b_{i,l}$ is the l-th cosine parameter corresponding to the i-th joint, $a_{i,l}$ is the l-th sine parameter corresponding to the i-th joint, L is the total Fourier series, $q_{0,i}$ is an initial pose of the i-th joint, $w_f$ is a Fourier fundamental frequency, $q_{i, min}$ is a minimum angle corresponding to the i-th joint, and $q_{i,max}$ is a maximum angle corresponding to the i-th joint.

In this embodiment, L sine parameters and L cosine parameters corresponding to the target joint may be determined through the above-mentioned constraint condition(s).

S200: determining a motion trajectory of the robot according to the sine parameter and the cosine parameter corresponding to the target joint.

In this embodiment, a pose of the target joint at each of a plurality of moments may be calculated according to an initial pose $q_{0,i}$ of the target joint and each sine parameter ($a_{i,l}$, where l=1, 2, ..., L) corresponding to the target joint and each cosine parameter ($b_{i,l}$, where l=1, 2, ..., L) corresponding to the target joint; a basic pose of the base coordinate system of the robot at each of the plurality of moments in a preset fixed coordinate system may be determined according to a transformation matrix and the pose of the target joint at each of the plurality of moments; and the motion trajectory may be determined according to the basic pose at each of the plurality of moments As an example, a Fourier transform vector corresponding to the target joint at the t-th moment may be calculated according to the Fourier fundamental frequency wf, the total Fourier series L, each sine parameter corresponding to the target joint, and each cosine parameter corresponding to the target joint, $1 \leq t \leq T$, T is the total number of moments, that is, the $$\text{Fourier transform vector} = \sum_{l}^{L} a_{i,l} * \sin(w_f * l * t) + b_{i,l} * \cos(w_f * l * t);$$

the target joint pose $q_i(t)$ of the target joint at the t-th moment may be calculated according to the Fourier transform vector at the t-th moment and the initial pose $q_{0,i}$ of the target joint, that is, $$q_i(t) = q_{0,i} + \sum_{l}^{L} a_{i,l} * \sin(w_f * l * t) + b_{i,l} * \cos(w_f * l * t).$$

It can be understood that the T $q_i(t)$ are equivalent to determining the motion trajectory of the robot.

S300: determining a motion terrain of the robot according to the motion trajectory.

Figure 2:
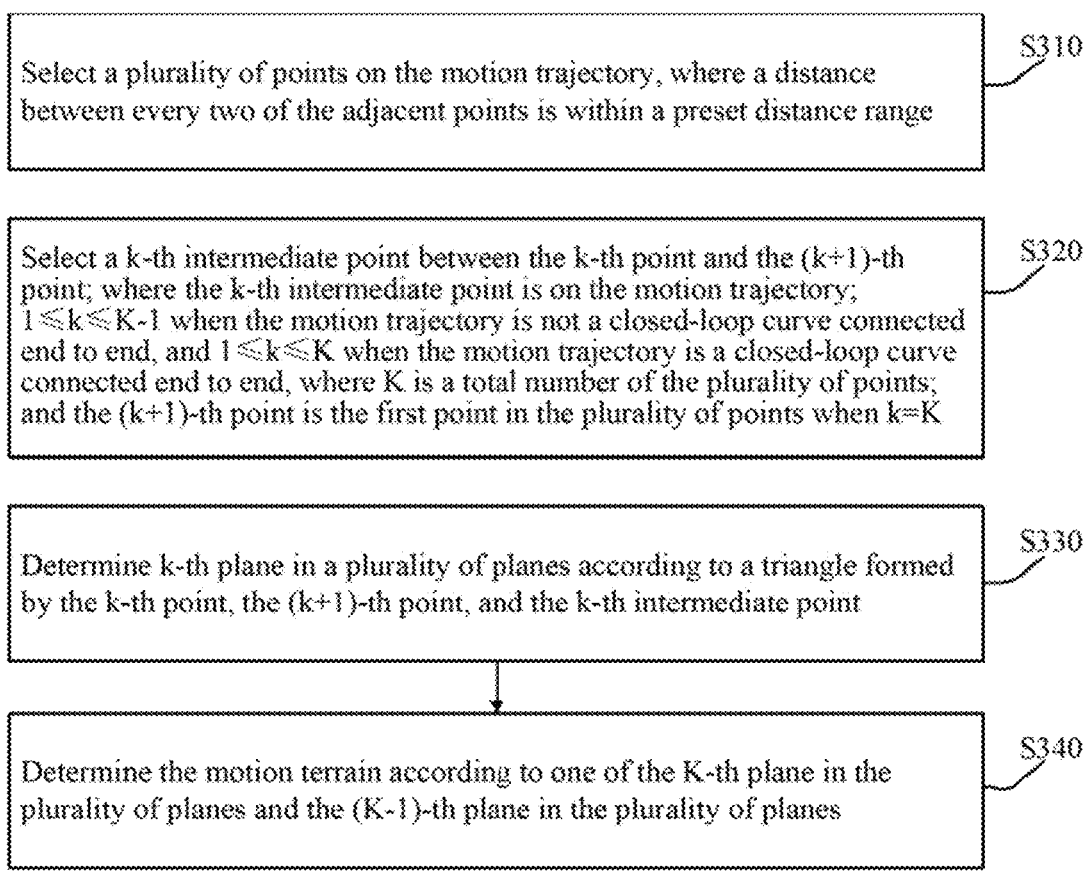
FIG. 2 is a flow chart of determining motion terrain in the motion terrain determining method of FIG. 1.

FIG. 2 is a flow chart of determining motion terrain in the motion terrain determining method of FIG. 1. As shown in FIG. 2, as an example, step S300 may include the following steps.

S310: selecting a plurality of points on the motion trajectory, where a distance between every two of the adjacent points is within a preset distance range.

Figure 3:
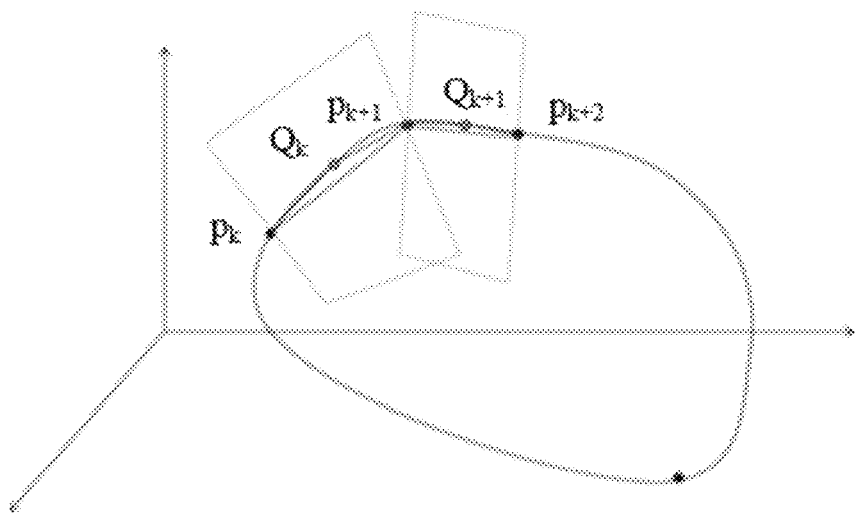
FIG. 3 is a schematic diagram of a motion trajectory according to an embodiment of the present disclosure.

FIG. 3 is a schematic diagram of a motion trajectory according to an embodiment of the present disclosure. As shown in FIG. 3, in this embodiment, the motion trajectory is a closed-loop curve connected end to end, and a plurality of points $p_1, p_2, \ldots$ may be selected on the closed-loop curve. It can be understood that, in other embodiments, the motion trajectory may also not be a closed-loop curve connected end to end.

In which, the distance between every two of the adjacent points is within the preset distance range, that is, the distance between $p_k$ and $p_{k+1}$ is guaranteed to be within the preset distance range.

S320: selecting a k-th intermediate point $Q_k$ between the k-th point $p_k$ and the (k+1)-th point $p_{k+1}$; where the k-th intermediate point is on the motion trajectory; $1 \leq k \leq K-1$ when the motion trajectory is not a closed-loop curve connected end to end, and $1 \leq k \leq K$ when the motion trajectory is a closed-loop curve connected end to end, where K is a total number of the plurality of points; and the (k+1)-th point is the first point in the plurality of points when k=K.

As shown in FIG. 3, the k-th intermediate point $Q_k$ is selected between the k-th point and the (k+1)-th point.

It can be understood that if the motion trajectory is the closed-loop curve in FIG. 3, there will be K intermediate points that can be determined, and the (k+1)-th point is the first point when k=K; otherwise, if the motion trajectory is not the closed-loop curve, there will be K K−1 intermediate points that can be determined.

S330: determining k-th plane in a plurality of planes according to a triangle formed by the k-th point, the (k+1)-th point, and the k-th intermediate point.

As shown in FIG. 3, the k-th plane is determined by the triangle formed by the k-th point $p_k$, the (k+1)-th point $p_{k+1}$ and the k-th intermediate point $Q_k$.

S340: determining the motion terrain according to one of the K-th plane in the plurality of planes and the (K−1)-th plane in the plurality of planes.

Figure 4:
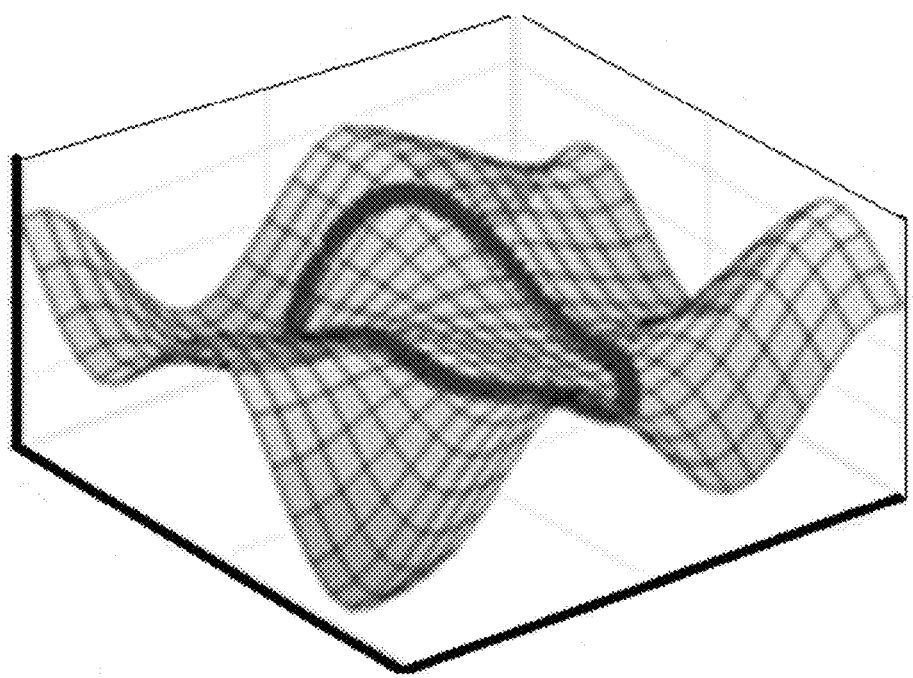
FIG. 4 is a schematic diagram of a motion terrain according to an embodiment of the present disclosure.

If the motion trajectory is a closed-loop curve, the motion terrain in FIG. 4 can be determined through K planes; otherwise, if the motion trajectory is not a closed-loop curve, a part of the motion terrain in FIG. 4 can be determined through K−1 planes.

In this embodiment, by determining each sine parameter and each cosine parameter corresponding to a target joint in a plurality of joints of the robot according to constraint condition(s); determining a motion trajectory of the robot according to the sine parameter and the cosine parameter corresponding to the target joint; and determining a motion terrain of the robot according to the motion trajectory, the best motion terrain can be obtained, and the robot is controlled to move on the determined motion terrain when determining the dynamics parameters of the robot, where the obtained dynamics parameters are more accurate. In this embodiment, the accuracy of the identification of the dynamics parameters can be improved effectively, thereby effectively improving the efficiency of the identification of the dynamics parameters.

Figure 5:
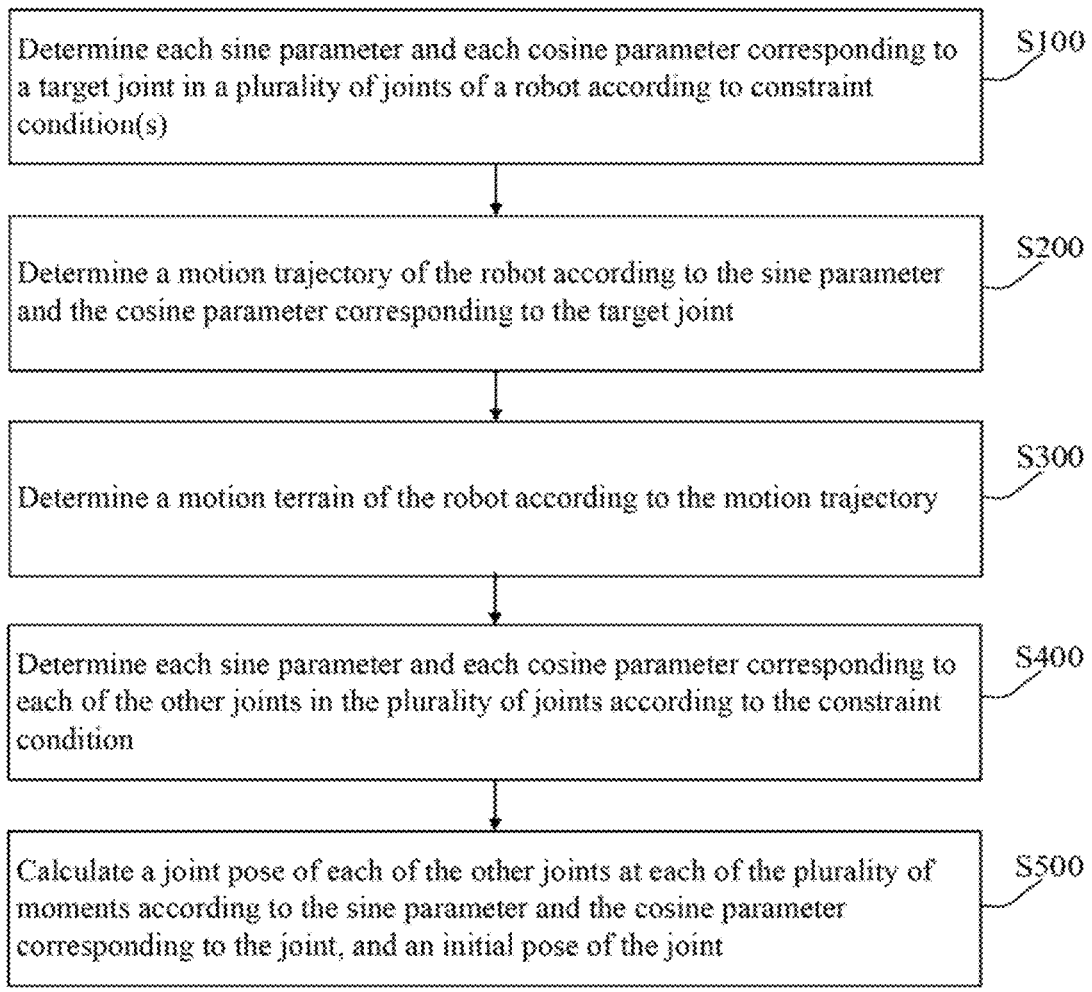
FIG. 5 is a flow chart of another motion terrain determining method according to an embodiment of the present disclosure.

FIG. 5 is a flow chart of another motion terrain determining method according to an embodiment of the present disclosure. As shown in FIG. 5, after the above-mentioned step S300, the motion terrain determining method may further include the following steps.

S400: determining each sine parameter and each cosine parameter corresponding to each of the other joints in the plurality of joints according to the constraint condition.

S500: calculating a joint pose of each of the other joints at each of the plurality of moments according to the sine parameter and the cosine parameter corresponding to the joint, and an initial pose of the joint.

It can be understood that the process of determining each sine parameter and each cosine parameter corresponding to each of the other joints and the joint pose of each of the other joints at each moment is the same as that of determining each sine parameter and each cosine parameter corresponding to the target joint and the joint pose of the target joint at each moment, and will not be repeated herein.

In this embodiment, through the above-mentioned steps S400 and S500, the joint pose of each joint corresponding to each point can be obtained when the robot is moved on the motion terrain, and then the joint pose of each joint can be changed in real time when the robot is controlled to move on the motion terrain determined herein, thereby achieving the accurate identification of dynamics parameters.

Embodiment II

Figure 6:
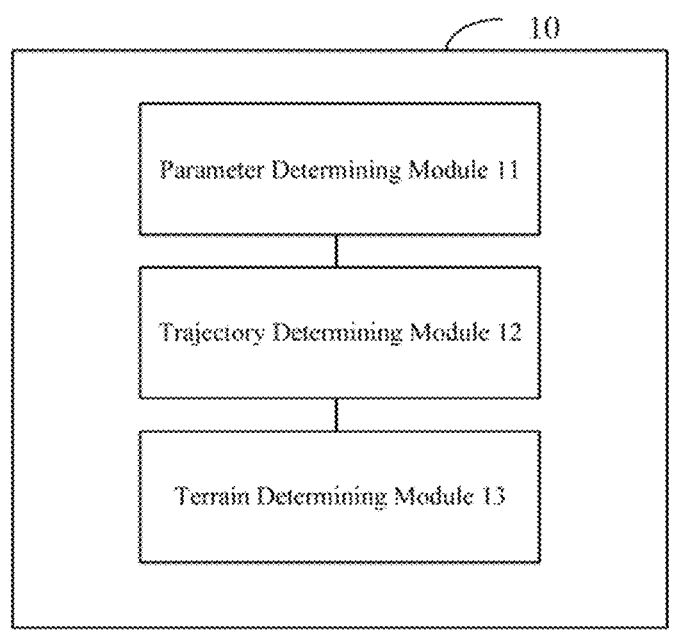
FIG. 6 is a schematic block diagram of a motion terrain determining apparatus according to an embodiment of the present disclosure.

FIG. 6 is a schematic block diagram of a motion terrain determining apparatus according to an embodiment of the present disclosure. In another embodiment, a motion terrain determining apparatus 10 is provided. As shown in FIG. 6, the motion terrain determining apparatus 10 may include a parameter determining module 11, a trajectory determining module 12, and a terrain determining module 13.

The parameter determining module 11 is configured to determine each sine parameter and each cosine parameter corresponding to a target joint in a plurality of joints of the robot according to one or more constraint conditions; the trajectory determining module 12 is configured to determine a motion trajectory of the robot according to the sine parameter and the cosine parameter corresponding to the target joint; and the terrain determining module 13 is configured to determine a motion terrain of the robot according to the motion trajectory.

In this embodiment, the motion terrain determining apparatus 10 combines the usage of the parameter determining module 11, the trajectory determining module 12, and the terrain determining module 13 to perform the motion terrain determining method described in the above-mentioned embodiment, and the solutions and beneficial effects involved in the above-mentioned embodiment are also applicable to this embodiment, which will not be repeated herein.

Embodiment III

Figure 7:
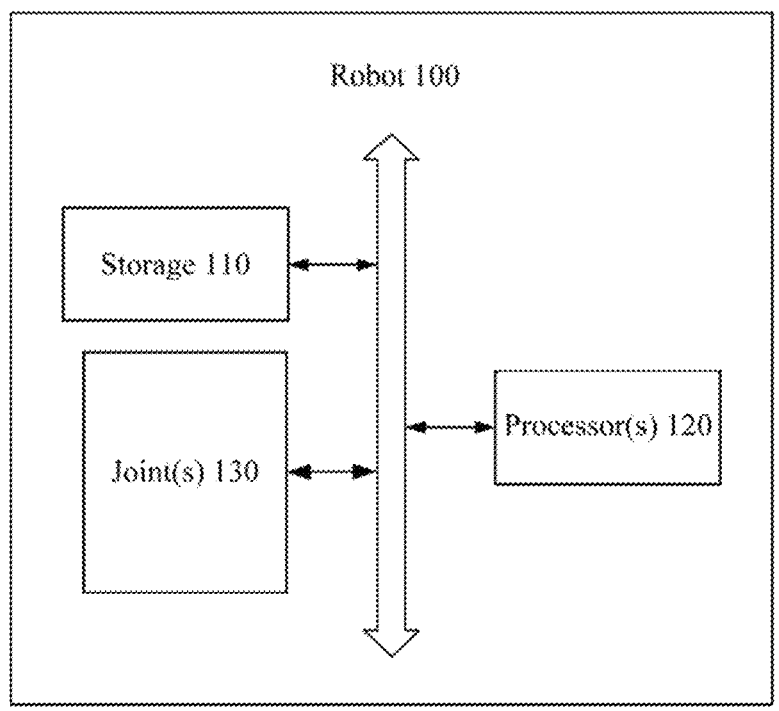
FIG. 7 is a schematic diagram of the structure of a robot according to an embodiment of the present disclosure.

FIG. 7 is a schematic diagram of the structure of a robot according to an embodiment of the present disclosure. As shown in FIG. 7, in the third embodiment of the present disclosure, a robot 100 is provided, which includes a storage 110, one or more processors 120 (only one is shown in FIG. 7), and one or more joints 130. The storage 110 stores a computer program. When the computer program is executed on the one or more processors 120, the motion terrain determining method is performed.

Embodiment IV

In the fourth embodiment, a non-transitory computer-readable storage medium is provided, which stores a computer program. When the computer program is executed on a processor, the processor executes the method for determining the sports terrain described in the embodiments of the present disclosure.

In the embodiments provided in the present disclosure, it should be understood that the disclosed apparatus (devices) and methods may also be implemented in other ways. The apparatus embodiments described above are only illustrative. For example, the flow charts and the structural diagrams in the drawings show the architectures, functions, and operations that are possible to be implemented according to the apparatus, methods and computer program products of the embodiments of the present disclosure. In this regard, each block in a flow chart or a block diagram may represent a module, program segment, or part of codes that includes executable instructions for implementing the specified logical functions. It should also be noted that, in alternative implementations, the functions noted in the blocks may occur out of the order noted in the figure. For example, two blocks in succession may, in fact, be executed substantially concurrently, or may sometimes be executed in the reverse order, depending upon the functionality involved. It is also to be noted that each block of a block diagram and/or a flow chart, and the combination of the blocks in the block diagram and/or the flow diagram, may be implemented by a dedicated hardware-based system that performs the specified function or action, or may be implemented by a combination of special purpose hardware and computer instructions.

In addition, each functional module or unit in each embodiment of the present disclosure can be integrated together to form an independent part, or each module can exist independently, or two or more modules can be integrated to form an independent part.

The functions a can be stored in a computer-readable storage medium if they are implemented in the form of a software functional unit and sold or utilized as a separate product. Based on this understanding, the technical solution of the present disclosure, either essentially or in part, contributes to the prior art, or a part of the technical solution can be embodied in the form of a software product. The software product is stored in a storage medium, which includes a number of instructions for enabling a computer device (which can be a personal computer, a server, a network device, etc.) to execute all or a part of the steps of the methods described in each of the embodiments of the present disclosure. The above-mentioned storage medium includes a variety of media such as a USB disk, a mobile hard disk, a read-only memory (ROM), a random access memory (RAM), a magnetic disk, and an optical disk which is capable of storing program codes.

The forgoing is only the specific embodiment of the present disclosure, while the scope of the present disclosure is not limited thereto. For those skilled in the art, various equivalent modifications or replacements that can be easily conceived within the technical scope of the present disclosure should be included within the scope of the present disclosure.

What is claimed is:

1. A computer-implemented motion terrain determining method for a robot, comprising:
   determining, by a processor of the robot, each sine parameter and each cosine parameter corresponding to a target joint in a plurality of joints of the robot according to one or more constraint conditions;
   determining, by the processor, a motion trajectory of the robot according to the sine parameter and the cosine parameter corresponding to the target joint;
   determining, by the processor, a motion terrain of the robot according to the motion trajectory; and
   controlling, by the processor, the robot to move on the motion terrain;
   wherein the step of determining, by the processor, the motion terrain of the robot according to the motion trajectory comprises:
   selecting, by the processor, a plurality of points on the motion trajectory, wherein a distance between every two of the adjacent points is within a preset distance range;
   selecting, by the processor, a k-th intermediate point between the k-th point and the (k+1)-th point: wherein the k-th intermediate point is on the motion trajectory; $1 \leq k \leq K-1$ when the motion trajectory is not a closed-loop curve connected end to end, and $1 \leq k \leq K$ when the motion trajectory forms a circle, wherein K is a total number of the plurality of points, and k is an intermediate point within K; and the (k+1)-th point is the first point in the plurality of points when k=K
   determining, by the processor, k-th plane in a plurality of planes according to a triangle formed by the k-th point, the (k+1)-th point, and the k-th intermediate point; and determining, by the processor, the motion terrain according to one of the K-th plane in the plurality of planes and the (K−1)-th plane in the plurality of planes.

2. The method of claim 1, wherein the determining the motion trajectory of the robot according to the sine parameter and the cosine parameter corresponding to the target joint comprises:
calculating a pose of the target joint at each of a plurality of moments according to an initial pose of the target joint and each sine parameter and each cosine parameter corresponding to the target joint;
determining a basic pose of a base coordinate system of the robot at each of the plurality of moments in a preset fixed coordinate system according to a transformation matrix and the pose of the target joint at each of the plurality of moments; and
determining the motion trajectory according to the basic pose at each of the plurality of moments.

3. The method of claim 2, wherein the calculating the pose of the target joint at each of the plurality of moments according to the initial pose of the target joint and each sine parameter and each cosine parameter corresponding to the target joint comprises:
calculating a Fourier transform vector corresponding to the target joint at the t-th moment according to a Fourier fundamental frequency, a total Fourier series, and each sine parameter and each cosine parameter corresponding to the target joint, wherein $1 \leq t \leq T$, T is a total number of the plurality of moments, and t is a moment within T; and
calculating the pose of the target joint at the t-th moment according to the Fourier transform vector at the t-th moment and the initial pose of the target joint.

4. The method of claim 1, wherein the one or more constraint conditions include at least one of one or more terrain constraints, a moving velocity constraint of a mobile platform for moving the robot, and a position constraint of a centroid of the robot.

5. The method of claim 4, wherein the one or more terrain constraints include at least one of a target position coordinate of a base coordinate system of the robot being within a preset calibration range, a change rate of the target position coordinate being within a preset positional change rate range, a target posture angle coordinate of the base coordinate system of the robot being within a preset angle range, and a change rate of the target posture angle coordinate being within a preset angle change rate range.

6. The method of claim 4, wherein the moving velocity constraint includes:
mapping a base coordinate system of the robot to a coordinate system of the mobile platform according to a mapping function between the base coordinate system of the robot and the coordinate system of the mobile platform; and
constraining a moving velocity of the coordinate system of the mobile platform within a preset velocity range.

7. The method of claim 4, wherein the position constraint of the centroid includes constraining a position of the centroid within a preset positional range.

8. The method of claim 1, wherein the target joint is any of the plurality of joints of the robot, and when the target joint is the i-th joint, the one or more constraint conditions include a Fourier-related constraint, and the Fourier-related constraint includes an equation of:

$$\sum_{l=1}^{L} \frac{b_{i,l}}{l} = q_{0,i}$$

$$\sum_{l=1}^{L} l * b_{i,l} = 0$$

$$\sum_{l=1}^{L} a_{i,l} = 0$$

$$-q_{i,min} + q_{0,i} \leq \sum_{l=1}^{L} \sqrt{a_{i,l}^2 + b_{i,l}^2} \leq q_{i,max} - q_{0,i}$$

$$\sum_{l=1}^{L} w_f * l * \sqrt{a_{i,l}^2 + b_{i,l}^2} \leq q_{i,max}$$

where, $b_{i,l}$ is the l-th cosine parameter corresponding to the i-th joint, $a_{i,l}$ is the l-th sine parameter corresponding to the i-th joint, L is the total Fourier series, $q_{0,i}$ is an initial pose of the i-th joint, $w_f$ is a Fourier fundamental frequency, $q_{i,min}$ is a minimum angle corresponding to the i-th joint, and $q_{i,max}$ is a maximum angle corresponding to the i-th joint.

9. The method of claim 1, further comprising:
determining each sine parameter and each cosine parameter corresponding to each of the other joints in the plurality of joints according to the constraint condition; and
calculating a joint pose of each of the other joints at each of the plurality of moments according to an initial pose of the joint and the sine parameter and the cosine parameter corresponding to the joint.

10. A robot, comprising:
a processor;
a memory coupled to the processor; and
one or more computer programs stored in the memory and executable on the processor;
wherein, the one or more computer programs comprise:
instructions for determining each sine parameter and each cosine parameter corresponding to a target joint in a plurality of joints of the robot according to one or more constraint conditions;
instructions for determining a motion trajectory of the robot according to the sine parameter and the cosine parameter corresponding to the target joint;
instructions for determining a motion terrain of the robot according to the motion trajectory; and
instructions for controlling the robot to move on the motion terrain;
wherein the instructions for determining the motion terrain of the robot according to the motion trajectory comprise:
instructions for selecting a plurality of points on the motion trajectory, wherein a distance between every two of the adjacent points is within a preset distance range;
instructions for selecting a k-th intermediate point between the k-th point and the (k+1)-th point; wherein the k-th intermediate point is on the motion trajectory; $1 \leq k \leq K-1$ when the motion trajectory is not a closed-loop curve connected end to end, and $1 \leq k \leq K$ when the motion trajectory forms a circle, wherein K is a total number of the plurality of points, and k is an intermediate point within K; and the (k+1)-th point is the first point in the plurality of points when k=K;

instructions for determining k-th plane in a plurality of planes according to a triangle formed by the k-th point, the (k+1)-th point, and the k-th intermediate point; and instructions for determining the motion terrain according to one of the K-th plane in the plurality of planes and the (K−1)-th plane in the plurality of planes.

11. The robot of claim 10, wherein the instructions for determining the motion trajectory of the robot according to the sine parameter and the cosine parameter corresponding to the target joint comprise:
   instructions for calculating a pose of the target joint at each of a plurality of moments according to an initial pose of the target joint and each sine parameter and each cosine parameter corresponding to the target joint;
   instructions for determining a basic pose of a base coordinate system of the robot at each of the plurality of moments in a preset fixed coordinate system according to a transformation matrix and the pose of the target joint at each of the plurality of moments; and
   instructions for determining the motion trajectory according to the basic pose at each of the plurality of moments.

12. The robot of claim 11, wherein the instructions for calculating the pose of the target joint at each of the plurality of moments according to the initial pose of the target joint and each sine parameter and each cosine parameter corresponding to the target joint comprise:
   instructions for calculating a Fourier transform vector corresponding to the target joint at the t-th moment according to a Fourier fundamental frequency, a total Fourier series, and each sine parameter and each cosine parameter corresponding to the target joint, wherein 1≤t≤T, T is a total number of the plurality of moments, and t is a moment within T; and
   instructions for calculating the pose of the target joint at the t-th moment according to the Fourier transform vector at the t-th moment and the initial pose of the target joint.

13. The robot of claim 10, wherein the one or more constraint conditions include at least one of one or more terrain constraints, a moving velocity constraint of a mobile platform for moving the robot, and a position constraint of a centroid of the robots.

14. The robot of claim 13, wherein the one or more terrain constraints include at least one of a target position coordinate of a base coordinate system of the robot being within a preset calibration range, a change rate of the target position coordinate being within a preset positional change rate range, a target posture angle coordinate of the base coordinate system of the robot being within a preset angle range, and a change rate of the target posture angle coordinate being within a preset angle change rate range.

15. The robot of claim 13, wherein the moving velocity constraint includes:
   mapping a base coordinate system of the robot to a coordinate system of the mobile platform according to a mapping function between the base coordinate system of the robot and the coordinate system of the mobile platform; and
   constraining a moving velocity of the coordinate system of the mobile platform within a preset velocity range.

16. The robot of claim 13, wherein the position constraint of the centroid includes constraining a position of the centroid within a preset positional range.

17. The robot of claim 10, wherein the target joint is any of the plurality of joints of the robot, the one or more constraint conditions include a Fourier-related constraint, and when the target joint is the i-th joint, the Fourier-related constraint includes an equation of:

$$\sum_{l=1}^{L} \frac{b_{i,l}}{l} = q_{0,i}$$

$$\sum_{l=1}^{L} l * b_{i,l} = 0$$

$$\sum_{l=1}^{L} a_{i,l} = 0 \quad ;$$

$$-q_{i,min} + q_{0,i} \le \sum_{l=1}^{L} \sqrt{a_{i,l}^2 + b_{i,l}^2} \le q_{i,max} - q_{0,i}$$

$$\sum_{l=1}^{L} w_f * l * \sqrt{a_{i,l}^2 + b_{i,l}^2} \le q_{i,max}$$

where, $b_{i,l}$ is the l-th cosine parameter corresponding to the i-th joint, $a_{i,l}$ is the l-th sine parameter corresponding to the i-th joint, L is the total Fourier series, $q_{0,i}$ is an initial pose of the i-th joint, $w_f$ is a Fourier fundamental frequency, $q_{i,min}$ is a minimum angle corresponding to the i-th joint, and $q_{i,max}$ is a maximum angle corresponding to the i-th joint.

18. A non-transitory computer-readable storage medium for storing one or more computer programs, wherein the one or more computer programs comprise:
   instructions for determining each sine parameter and each cosine parameter corresponding to a target joint in a plurality of joints of a robot according to one or more constraint conditions;
   instructions for determining a motion trajectory of the robot according to the sine parameter and the cosine parameter corresponding to the target joint;
   instructions for determining a motion terrain of the robot according to the motion trajectory; and
   instructions for controlling the robot to move on the motion terrain;
   wherein the instructions for determining the motion trajectory of the robot according to the sine parameter and the cosine parameter corresponding to the target joint comprise:
      instructions for calculating a pose of the target joint at each of a plurality of moments according to an initial pose of the target joint and each sine parameter and each cosine parameter corresponding to the target joint;
      instructions for determining a basic pose of a base coordinate system of the robot at each of the plurality of moments in a preset fixed coordinate system according to a transformation matrix and the pose of the target joint at each of the plurality of moments; and
      instructions for determining the motion trajectory according to the basic pose at each of the plurality of moments; and
   wherein the instructions for calculating the pose of the target joint at each of the plurality of moments according to the initial pose of the target joint and each sine parameter and each cosine parameter corresponding to the target joint comprise:
      instructions for calculating a Fourier transform vector corresponding to the target joint at the t-th moment according to a Fourier fundamental frequency, a total Fourier series, and each sine parameter and each cosine parameter corresponding to the target joint, wherein $1 \leq t \leq T$, T is a total number of the plurality of moments, and t is a moment within T; and instructions for calculating the pose of the target joint at the t-th moment according to the Fourier transform vector at the t-th moment and the initial pose of the target joint.

19. The non-transitory computer-readable storage medium of claim 18, wherein the instructions for determining the motion terrain of the robot according to the motion trajectory comprise:

instructions for selecting a plurality of points on the motion trajectory, wherein a distance between every two of the adjacent points is within a preset distance range;

instructions for selecting a k-th intermediate point between the k-th point and the (k+1)-th point; wherein the k-th intermediate point is on the motion trajectory; $1 \leq k \leq K-1$ when the motion trajectory is not a closed-loop curve connected end to end, and $1 \leq k \leq K$ when the motion trajectory forms a circle, wherein K is a total number of the plurality of points, and k is an intermediate point within K; and the (k+1)-th point is the first point in the plurality of points when k=K;

instructions for determining k-th plane in a plurality of planes according to a triangle formed by the k-th point, the (k+1)-th point, and the k-th intermediate point; and instructions for determining the motion terrain according to one of the K-th plane in the plurality of planes and the (K−1)-th plane in the plurality of planes.

20. The non-transitory computer-readable storage medium of claim 18, wherein the one or more constraint conditions include at least one of one or more terrain constraints, a moving velocity constraint of a mobile platform for moving the robot, and a position constraint of a centroid of the robot.

* * * * *